Jan. 16, 1940. S. E. HEVERS 2,187,029
TEAPOT
Filed Feb. 17, 1938
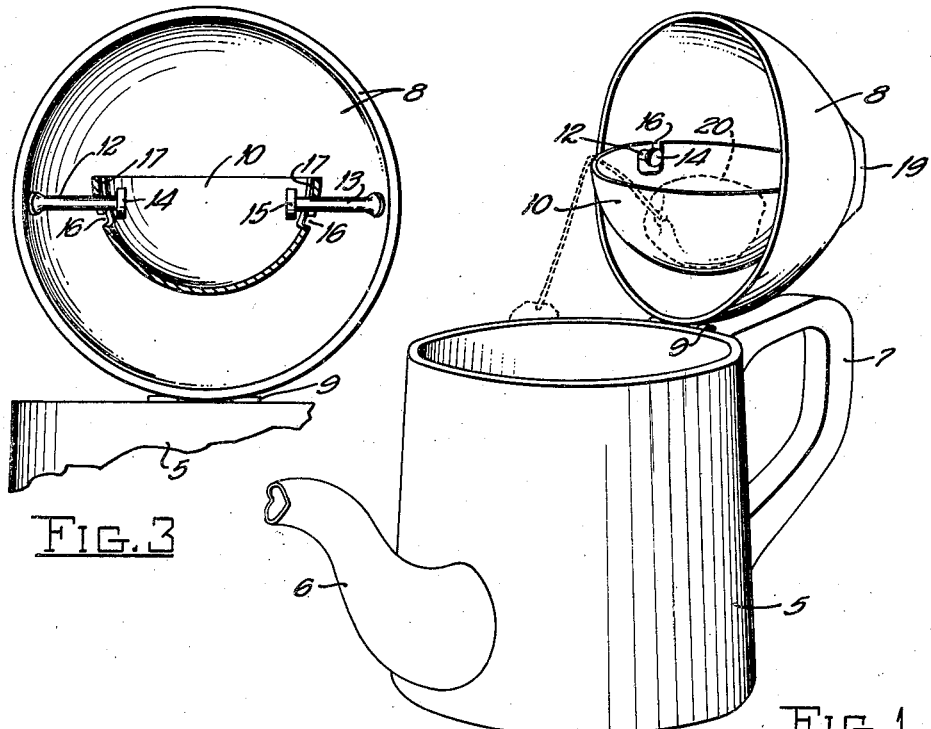
FIG. 3
FIG. 1
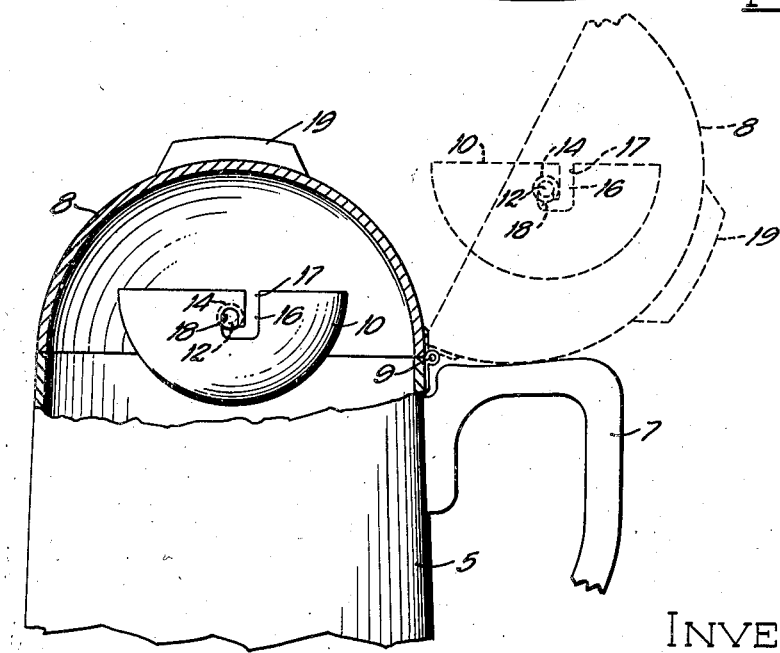
FIG. 2
INVENTOR:
Sylvester E. Hevers Patented Jan. 16, 1940

2,187,029

UNITED STATES PATENT OFFICE 2,187,029

TEAPOT

Sylvester E. Hevers, Waterford, N. Y.

Application February 17, 1938, Serial No. 191,030

5 Claims. (Cl. 53—3)

The invention relates to improvements in the container hereinafter described with relation to the storing, use, and withdrawal and disposal of an infusing agent or other substance used in such container.

Beverages made by infusion are prepared and served in an unsatisfactory manner. Tea, for example, prepared through the use of tea balls or tea bags fails to fulfill four important functions as it is prepared and served and as the infusing agent is disposed of after use. The faults are: (a) lack of means for sanitation, (b) lack of means for pre-heating the infusing substance prior to use thereof, (c) lack of convenient, useful and suitable means for disposing of the infusing agent to prevent over-infusion, and (d) lack of convenient and suitable means of serving the unused infusing agent.

Universally in hotels and restaurants, and through the copying of their methods, frequently in homes, the faults occur through either one of the following methods which are the usual methods of serving such beverages.

In the first method: The tea ball is placed in the teapot immediately after the water has been poured in, and the teapot is then carried some distance to the guest's table. The teapot is often placed on the guest's table with the first or second course of a meal, and there remains, frequently for fifteen or twenty minutes with the tea ball immersed in the water, until the guest pours the tea into his cup, and even then the tea ball is permitted to remain in the teapot immersed in the liquid in most instances. Rarely does the guest have any place to put the tea ball if he desires to remove it from the liquid. In most cases where the tea ball has been placed in the teapot by the servant before the teapot is brought to the guest, there is not even a saucer or other container provided for disposal of the tea ball after infusion. This lengthy infusion thereby resulting, causes an excess of tannin to be extracted from the tea leaves, thus providing an imperfect and harmful beverage.

In the second method: Where the teapot is placed on a saucer before it is delivered to the guest's table it is the custom to have the tea ball placed on the saucer instead of in the teapot when delivered to the guest. While this may afford means to prevent over-infusion, by presenting to the guest the privilege of placing the tea ball in the vessel when he so desires, the method is unsanitary, in that the tea ball is placed on the saucer before use, where it comes in contact with both the saucer and the outside of the teapot. This contamination is the more serious because the teapots are always handled by several persons before delivery to the guest. The guest places the tea ball in the teapot for infusion purposes. Since a proper infusion is essential to a correct beverage, the tea ball should be removed from the water within from three to five minutes after it is placed therein. If it is removed it is placed again on the saucer, and there it is unsightly and a quantity of the beverage appears in the saucer and around the bottom of the teapot.

An object of my invention is to have a container adapted for use as a beverage vessel which is so designed and arranged that when an infusing agent is used therewith, a means is provided for permitting the original serving of the vessel with the liquid contained therein but without the infusing agent in the liquid at the time of serving, thereby affording a clean method of serving the infusing agent within the container but not in the liquid, and at the same time affording means for pre-heating and pre-softening the infusing agent, prior to use, especially when tea leaves are the infusing agent, since such infusing agent is held close to and directly above the liquid, which is usually water, and which is customarily heated to the boiling point at the time it is placed in the container, thereby affording steam and vapors rising directly to the infusing agent to accomplish the purpose of pre-heating and pre-softening.

Another object is to afford means to hold the infusing agent, customarily in the form of a tea bag or tea ball within the container from the time the liquid is placed in the container until the guest is ready to make the beverage by means of placing the infusing agent in the liquid, and affording a convenient place inside the container in which to replace the tea ball or other agent after the desired time of infusion has elapsed.

A particular object is to provide a receptacle within the container in such manner that it does not require the use of any operating means other than the operation of the cover in the usual manner to present the receptacle for use, either to place the tea ball therein or remove it therefrom.

Another object is to provide a container with a receptacle movably supported therein so that the tea ball will be securely held therein whether the cover of the container is open or closed or being opened or closed or tilted or at rest.

A further object is to provide a container with a readily insertable or removable receptacle pivotally supported therein so that the opening of the receptacle is at all times practically horizontal regardless of whether the cover is opened or closed or being opened or closed or the container tilted or at rest.

One form of the invention is illustrated in the accompanying drawing in which Fig. 1 is a perspective view of the container illustrating a proposed embodiment of my invention; Fig. 2 is a fragmentary elevation view of my receptacle, partially in section; and Fig. 3 is a fragmentary view of the container body showing the cover in raised position and the inner receptacle in section.

In the drawing, 5 is the container with a spout 6, a handle 7 and a cover 8 with said cover 8 connected to the container 5 by means of a hinge 9. The cover 8 may be connected to body 5 by means of hinge 9 or connected to an apparatus attached to the container to hold the cover thereon, such as may well be used if the container is of pottery or other similar material.

Within the cover 8 are trunnions 12 and 13 fastened to said cover 8 and protruding inside said cover, trunnions 12 and 13 preferably being provided respectively at or near the ends thereof with bosses 14 and 15. A receptacle 10 is provided with curved slots 16, one on either side thereof and substantially opposite each other, said slot openings being adapted to accommodate the trunnions 12 and 13 pivotally to support said receptacle on cover 8. By way of example, as illustrated, slots 16 preferably comprise the substantially vertically extending portions 17 which extend from the upper periphery of receptacle 10 downwardly and communicate with the portions 18, the upper ends of portions 18 being adapted to rest on trunnions 12 and 13 pivotally to support the receptacle. Attached to the exterior of the cover 8 is a handle 19, and 20 represents a tea bag shown in dotted lines, with string and tag attached thereto in position in the receptacle.

Fig. 3 shows in dotted lines the cover 8 in raised position and illustrates the position of receptacle 10 relative thereto. In view of the manner in which said receptacle 10 is supported the upper periphery thereof will remain substantially in a horizontal plane for all positions of the cover 8, as clearly shown in the drawings.

In using my device, receptacle 10 will be inserted in position to rest upon trunnions 12 and 13 by passing the trunnions through the portions 17 of slots 16 and into the portions 18 thereof, whereby the upper ends of the portions 18 of slots 16 form bearing surfaces, thereby holding receptacle 10 upon said trunnions 12 and 13.

One form of the invention comprises a container of the described class, with body, handle, spout and cover, the cover being somewhat dome-like, having suspended therefrom a receptacle, tray-like or hollow cupped, easily insertable and removable or fixed, and suspended on its axis so formed that when the receptacle is in place resting upon its bearings and the cover is resting in its normal down or covering position, the tray or receiving area of the receptacle is approximately parallel to the base of the container. It is optional, however, to change its relative position by means of weight distribution or placement of its bearings so that it will normally rest in a tilted position. When the cover is being raised or lowered on its hinge or the means connecting the cover to the container or to an apparatus attached to the container to hold the cover thereon, such as may well be used if the container is of pottery or other similar material, the said receptacle therein continues to remain approximately parallel with the base of the container. The receptacle also remains parallel to the ground when the container is tilted as in pouring beverages therefrom. When the cover is opened the receptacle presents a receiving area adapted to receive a tea ball or other substance. Therefore, by means of the usual operation of the cover upon its hinge in the customary manner, and without other mechanical means of operation the receptacle is presented when the cover is opened and affords a convenient and efficient means to hold a tea ball or other substance.

It is particularly pointed out that the receptacle may well be provided with pivots and that these may rest in openings within or bodies attached to the cover, and by many this construction may be preferred. The receptacle itself may be formed in various shapes and either deep centered or shallow, weighted or otherwise. The cover, of course, and the receptacle may be made in many designs other than the one shown in the accompanying drawing. It is likewise optional to have the receptacle body perforated or slotted through the receiving area.

It is obvious that many variations may be made in the construction of my device without deviating from the intent herein disclosed, and I do not limit myself to the particular design or construction shown in the accompanying drawing.

I claim:

1. A teapot comprising a body portion, a dome-like cover and a hinge for pivotally connecting said cover to said body, a receptacle open at its top and of a size order adapting it to rotate within said cover and means for rotatably supporting said receptacle on said cover and in close relation thereto with the open top of said receptacle uppermost, said means being arranged rotatably to support said receptacle on an axis fixed in relation to said cover and spaced from the top of said cover sufficiently to permit said receptacle to rotate to a substantial degree between said axis and cover and said axis being arranged substantially parallel with the axis of said hinge whereby said receptacle will move with said cover and may rotate relative thereto; and said cover and receptacle being so constructed, correlated and relatively arranged that said receptacle will rotate relative to said cover and to a substantial degree as said cover is pivoted about said hinge whereby for all positions of said cover the open top of said receptacle may remain uppermost.

2. A teapot comprising a body portion, a dome-like cover and a hinge for pivotally connecting said cover to said body, a receptacle open at its top and of a size order adapting it to rotate within said cover and means for removably and rotatably supporting said receptacle on said cover and in close relation thereto with the open top of said receptacle uppermost, said means being arranged rotatably to support said receptacle on an axis fixed in relation to said cover and spaced from the top of said cover sufficiently to permit said receptacle to rotate within and to a substantial degree between said axis and cover and said axis being arranged substantially parallel with the axis of said hinge whereby said receptacle will move with said cover and may rotate relative thereto; and said cover and receptacle being so constructed, correlated and relatively arranged that said receptacle will rotate within and relative to said cover and to a substantial degree as said cover is pivoted about said hinge whereby for all positions of said cover the open top of said receptacle may remain uppermost.

3. A teapot comprising a body portion, a dome-like cover and a hinge for pivotally connecting said cover to said body, a receptacle open at its top and of a size order adapting it to rotate within said cover, said receptacle being provided with an opening, and a pin journaled in said opening and secured in fixed relation to a side of said cover, said pin being arranged substantially parallel with the axis of said hinge and spaced from the top of said cover sufficiently to permit said receptacle to rotate to a substantial degree between said pin and cover; and said cover and receptacle being so constructed, correlated and relatively arranged that said receptacle will rotate relative to said cover and to a substantial degree as said cover is pivoted about said hinge whereby for all positions of said cover the open top of said receptacle may remain uppermost.

4. A teapot comprising a body portion, a dome-like cover and a hinge for pivotally connecting said cover to said body, a receptacle open at its top and of a size order adapting it to rotate within said cover, opposite sides of said receptacle being provided with slots, and trunnions secured to opposite sides of said cover and adapted to be journaled in said slots, said trunnions being arranged substantially parallel with the axis of said hinge and spaced from the top of said cover sufficiently to permit said receptacle to rotate to a substantial degree between said trunnions and cover when said receptacle is rotatably mounted thereon, and said cover and receptacle being so constructed, correlated and relatively arranged that said receptacle will rotate relative to said cover and to a substantial degree as said cover is pivoted about said hinge whereby for all positions of said cover the open top of said receptacle may remain uppermost.

5. In a teapot, the combination with a dome-like cover of a comparatively shallow receptacle open at its top and of a size order adapting it to rotate within said cover and means for rotatably supporting said receptacle on said cover with the open top of said receptacle uppermost and in such close relation to said cover that said receptacle will rotate therewithin, said means being arranged rotatably to support said receptacle on an axis fixed in relation to said cover and spaced from the top of said cover sufficiently to permit said receptacle to rotate to a substantial degree between said axis and cover; and said cover and receptacle being so constructed and relatively arranged that said receptacle may rotate to a substantial degree within said cover when said cover is tipped.

SYLVESTER E. HEVERS.